(12) United States Patent
Pruzan et al.

(10) Patent No.: US 10,703,501 B2
(45) Date of Patent: Jul. 7, 2020

(54) DROGUE CONTROL SYSTEMS AND APPARATUS

(71) Applicant: Analytical Mechanics Associates, Inc., Hampton, VA (US)

(72) Inventors: Daniel Allan Pruzan, Redwood City, CA (US); Daniel Joseph Lesieutre, San Jose, CA (US)

(73) Assignee: ANALYTICAL MECHANICS ASSOCIATES, INC., Hampton, VA (US)

( * ) Notice: Subject to any disclaimer, the term of this patent is extended or adjusted under 35 U.S.C. 154(b) by 473 days.

(21) Appl. No.: 15/461,685

(22) Filed: Mar. 17, 2017

(65) Prior Publication Data

US 2018/0265212 A1    Sep. 20, 2018

(51) Int. Cl.
*B64D 39/06* (2006.01)
*B64D 39/02* (2006.01)
*B64D 39/04* (2006.01)

(52) U.S. Cl.
CPC .............. *B64D 39/02* (2013.01); *B64D 39/04* (2013.01); *B64D 39/06* (2013.01)

(58) Field of Classification Search
CPC ......... B64D 39/00; B64D 39/04; B64D 39/06
See application file for complete search history.

(56) References Cited

U.S. PATENT DOCUMENTS

| | | | | |
|---|---|---|---|---|
| 2,582,609 A | * | 1/1952 | Steele | B64D 39/04 244/135 A |
| 3,011,737 A | * | 12/1961 | Morrow | B64D 39/00 244/3 |
| 3,111,088 A | | 11/1963 | Fisk | |
| 5,326,052 A | | 7/1994 | Krispin et al. | |
| 5,393,011 A | | 2/1995 | Dunn et al. | |
| 5,393,012 A | | 2/1995 | Dunn | |
| 6,981,672 B2 | | 1/2006 | Clancy et al. | |
| 7,219,857 B2 | | 5/2007 | Takacs et al. | |
| 7,404,530 B2 | | 7/2008 | Saggio, III et al. | |
| 8,186,623 B2 | | 5/2012 | Feldmann | |
| 8,733,704 B1 | | 5/2014 | Speer et al. | |
| 8,763,955 B1 | | 7/2014 | Musgrave et al. | |
| 2004/0050998 A1 | * | 3/2004 | Edwards | B64D 39/06 244/10 |
| 2005/0045768 A1 | * | 3/2005 | Saggio, III | B64D 39/00 244/135 A |

(Continued)

OTHER PUBLICATIONS

Ellsworth et al., "Guided Drogue Flight Test Report," Naval Air Systems Command TR E-23027, Sep. 1977.

(Continued)

*Primary Examiner* — Philip J Bonzell
*Assistant Examiner* — Tye William Abell
(74) *Attorney, Agent, or Firm* — Mueting, Raasch & Gebhardt, P.A.

(57) ABSTRACT

Systems, apparatus, and methods may control movement of an object through a fluid. The systems, apparatus, and methods may utilize a rotatable control unit including a pair of fins to generate a control force at least partially perpendicular to a direction of travel of the object through the fluid. One fin may be configured to generate a different amount of rolling moment than the other fin to provide rotational acceleration and energy production.

14 Claims, 12 Drawing Sheets

(56) References Cited

U.S. PATENT DOCUMENTS

2010/0001124 A1* 1/2010 Feldmann .............. B64D 39/04
244/58
2012/0168564 A1* 7/2012 Feldmann .............. B64D 39/06
244/135 A
2017/0190440 A1* 7/2017 McLaughlin .......... B64D 39/04

OTHER PUBLICATIONS

Kuk, Taeseung, "Active Control of Aerial Refueling Drogue," (2014). *Dissertations*. Paper 256.
Kuk et al., "Design, Test and Evaluation of an Actively Stabilized Drogue Refueling System," AIAA-2011-1423, Mar. 2011.
Ro et al., "Active Control of Aerial Refueling Hose-Drogue Systems," AIAA-2010-8400, Aug. 2010.
Williamson et al., "Controllable Drogue for Automated Aerial Refueling," *Journal of Aircraft*, Mar.-Apr. 2010, 47(2): 515-527.

* cited by examiner

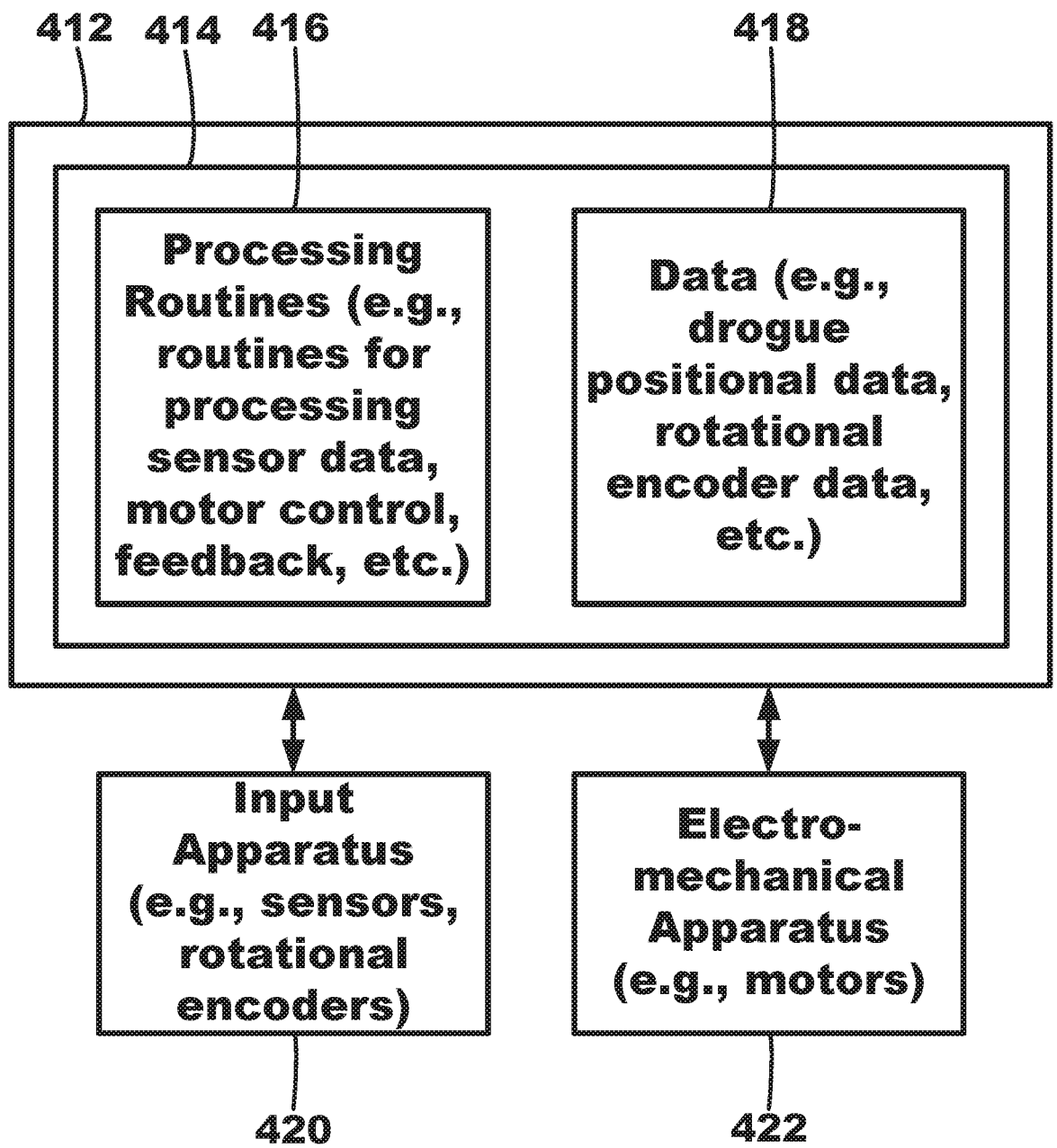

DROGUE CONTROL SYSTEMS AND APPARATUS

This invention was made with government support from Air Force SBIR Phase II contract F33615-03-C-3308 and Navy SBIR Phase I contract N68335-08-C-0085. The government has certain rights in the invention.

The present disclosure pertains to systems and apparatus for controlling movement of an object through a fluid. The exemplary systems and apparatus may include a rotatable control unit coupled to an object such as, e.g., a drogue refueling apparatus, an aircraft, a spacecraft, a water craft, etc. moving through a fluid (e.g., an atmosphere, a body of water, etc.) and configured to controllably rotate about an axis to control movement of the object through the fluid.

The object, the movement of which may be at least partially controlled, may be a drogue refueling apparatus 10 as shown in FIG. 1, which is used to refuel aircraft in flight. The drogue refueling apparatus 10 may include refueling coupling 12, a drogue 13 coupled to the refueling coupling 12, and a fuel hose 14 coupling the refueling coupling 12 to a tanker aircraft 15 towing the drogue refueling apparatus 10 through the air. The fuel hose 14 may be described as extending from a forward end portion 17 that is attached, or coupled, to the tanker aircraft 15 to an aft end portion 16 that is attached, or coupled, to the drogue refueling apparatus 10 and, more specifically, to the refueling coupling 12 of the drogue refueling apparatus 10. It is to be understood that the fuel hose 14 and the drogue refueling apparatus 10 may be retracted and stowed within or proximate the tanker aircraft 15 and extended, or unfurled, away from the tanker aircraft 15 to position the refueling coupling 12 so as to be used by another aircraft for refueling. For example, the refueling coupling 12 may be configured to be mated, or operatively coupled, with a corresponding refueling probe 22 of an aircraft 20 to be refueled by the tanker aircraft 15. Once the refueling probe 22 of the aircraft 20 is properly mated, or operatively coupled, to the refueling coupling 12, the aircraft 20 may be refueled through the fuel hose 14. In other words, the aircraft 20 may be described as being equipped with a refueling probe 22 that can plug into the refueling coupling 12 to provide a flow path for fuel from the tanker aircraft 15 through the fuel hose 14, the refueling coupling 12, and the refueling probe 22 into the aircraft 20.

Typically, drogue refueling apparatus, and components thereof, are passive such that they are subject to motion induced by one or more of atmospheric turbulence, tanker wake, tanker motion, and receiver forebody effects. Such motion may make it difficult for aircraft to successfully and efficiently mate with drogue refueling apparatus. Additionally, such motion may increase the likelihood of higher-than-normal impact loads between a refueling probe of an aircraft and such drogue refueling apparatus, which may result in damage to one or more of the refueling probe, the aircraft, and the drogue refueling apparatus.

SUMMARY

The exemplary systems and apparatus may be described as being configured to actively stabilize drogue refueling apparatus to reduce induced motion, which may significantly increase the success rate, safety, and cost effectiveness of aerial refueling for both manned and unmanned receiver aircraft. By presenting a more stable target to the receiver aircraft, the exemplary systems and apparatus may be described as being able to significantly reduce the probability of missed contact, which may reduce the time required to refuel each aircraft in a squadron (which, in turn, may allow each tanker asset to support a greater number of aircraft and/or reduce the time and fuel wasted by the squadron waiting for the last aircraft of the squadron to refuel).

The stability provided by the exemplary systems and apparatus may also be described as reducing the tendency for higher-than-nominal closure rates and off-center contacts that can result in damage to the drogue refueling apparatus, the refueling probe, and the refueling aircraft. This can lead to significant improvements in safety and cost for all manned and unmanned aircraft, but may be especially significant for FOD (foreign object debris) sensitive aircraft such as, e.g., the LOCKHEED MARTIN F-35 Lightning II and the BELL BOEING V-22 Osprey. A stabilized drogue refueling apparatus may be described as an important piece of technology to achieve operationally acceptable efficiency for automated aerial refueling. The exemplary systems and apparatus may also be described as being configured to move the drogue refueling apparatus to a desired position relative to the tanker aircraft or the receiver aircraft based on control inputs.

The disclosed systems and apparatus can also be applied to other non-refueling systems that may utilize the generation of a control force on a body moving through a fluid medium. Typical examples include missiles, artillery shells, and torpedoes. Another exemplary case may be the use of a drogue-controlled tether to facilitate the capture of one aircraft by another aircraft in flight.

One exemplary system for controlling movement of a drogue refueling apparatus may include a rotatable control unit to controllably rotate about an axis to move the drogue refueling apparatus in a direction at least partially perpendicular to the axis. The rotatable control unit may include a body portion rotatably couplable to the drogue refueling apparatus and one or more resilient fins fixedly coupled to and extending from the body portion along one or more fin planes. The one or more resilient fins may be resilient to deflection to generate at least a rotational force about the axis in response to fluid flow as the drogue refueling apparatus moves along a direction of travel. Further, at least one resilient fin extends from the body such that the fin plane of the at least one resilient fin is non-coplanar with the axis.

One exemplary system for controlling movement of an object may include a rotatable control unit rotatably couplable to the object to controllably rotate about an axis to move the object in a direction at least partially perpendicular to the axis. The rotatable control unit may include body portion rotatably couplable to the object, a first resilient fin fixedly coupled to and extending from the body portion along a first fin plane where a first deflection angle is defined between the first fin plane and the axis, and a second resilient fin fixedly coupled to and extending from the body portion along a second fin plane where a second deflection angle is defined between the second fin plane and the axis. The first deflection angle may be greater than the second deflection angle. The first and second resilient fins may be resilient to deflection to generate at least opposing rotational forces about the axis in response to fluid flow as the object moves along a direction of travel. In at least one embodiment, the rotatable control unit may be rotatably couplable to drogue refueling apparatus. The body portion may be couplable to the drogue refueling apparatus forward of a refueling coupling of the drogue refueling apparatus in the direction of travel of the drogue refueling apparatus.

One exemplary kit for retrofitting a drogue refueling apparatus may include an elongate member extending from a forward end region couplable to a fuel hose of a drogue refueling apparatus to a rearward end region couplable to a refueling coupling of the drogue refueling apparatus and a rotatable control unit to controllably rotate about an axis to move the drogue refueling apparatus in a direction at least partially perpendicular to the axis. The rotatable control unit may include a body portion rotatably couplable to the elongate member to controllably rotate about an axis to move the drogue refueling apparatus in a direction at least partially perpendicular to the axis and one or more resilient fins extending from the body portion. The one or more resilient fins may be resilient to deflection to generate rotational force about the axis in response to fluid flow as the drogue refueling apparatus moves along a direction of travel.

In one or more embodiments, the one or more fins may include a first fin and a second fin. A first deflection angle may be defined between the fin plane of the first fin and the axis and a second deflection angle may be defined between the fin plane of the second fin and the axis. The first deflection angle may be greater than the second deflection angle. Further, the first and second fins may be positioned about the body portion to produce opposing rotational moments about the axis in response to fluid flow as the drogue refueling apparatus moves along a direction of travel.

In one or more embodiments, the body portion may be couplable to the drogue refueling apparatus forward of a refueling coupling of the drogue refueling apparatus in the direction of travel of the drogue refueling apparatus.

In one or more embodiments, the system may further include an elongate member extending from a forward end region couplable to a hose to a rearward end region couplable to a refueling coupling of the drogue refueling apparatus. The rotatable control unit may be rotatably coupled to the elongate member between the forward end region and the rearward end region.

In one or more embodiments, the system may further include one or more electric motors operably coupled to the rotatable control unit to rotate the rotatable control unit about the axis and a controller including one or more processors and operably coupled to the one or more motors. The controller may be configured to selectively control the rate of rotation of the rotatable control unit to move the drogue refueling apparatus in a direction at least partially perpendicular to the axis. Further, the system may further include one or more electricity storage units, and the one or more electric motors may be operably coupled to the one or more electricity storage units and to the rotatable control unit to generate electricity to be stored in the electricity storage units when the rotatable control unit rotates about the axis.

In one or more embodiments, the body portion and the one or more resilient fins may be integrally molded to define the rotatable control unit.

One exemplary system may be described as being integrated with a drogue refueling apparatus including a refueling coupling, a drogue, and a fuel hose. The refueling assembly may be coupled to the fuel hose extending from a tanker aircraft for the purpose of performing air-to-air refueling of a secondary receiver aircraft. The system may include a rotating control unit, which may be mounted between an end of the fuel hose and an inlet of the fuel hose to the refueling coupling.

For example, it may be described that the rotatable control unit may be mounted just forward of the refueling coupling. Further, for example, it may be described that the rotatable control unit may be located, or positioned, upstream from the refueling coupling when the refueling coupling is moving along a direction of travel. Further, the rotatable control unit may include, or incorporate, two low-aspect-ratio fins that are coupled (e.g., integrally molded) to a central, axisymmetric body portion. Both control fins may be described as being rigidly attached to the central body at fixed deflection angles that are in the same direction but are of slightly different magnitude. In one embodiment, one fin is deflected 12° while the other is deflected 20°.

As the rotatable control unit is pulled through the air by the tanker aircraft, both fins may be described as working together to produce a relatively large aerodynamic control force. Further, the fins may generate opposing but unequal rolling moments that work against each other to produce a relatively small net rolling moment.

Further, in one or more embodiments, in operation, when no control force is used to stabilize the drogue refueling apparatus, the rotatable control unit may be allowed to rotate under the influence of the net rolling moment. Because this rotation rate may be sufficiently faster than the natural frequency of the combined fuel hose, rotatable control unit, and drogue apparatus, the control force (which may always be present due to the fixed deflection of the fins) may impart no significant motion to the drogue refueling apparatus (e.g., the refueling coupling and the drogue). When a net control force is desired to stabilize the drogue refueling apparatus, an internal electric motor may be used to slow the rotation rate of the rotatable control unit over a portion of the rotation cycle when the control force vector is pointing in the desired direction. If a small force is desired, the rotation rate may be decreased a relatively small amount over a portion of the complete cycle, and if a larger control force is desired, the rotation rate over a relatively larger arc portion, or section, may be decreased further. Further, the maximum available control force may be achieved by completely stopping the rotation of the rotatable control unit when the force vector is pointing in the desired direction.

Still further, in one or more embodiment, the system may include, or use, sensors (e.g., sensors within the rotatable control unit, sensors external from the rotatable control unit such as, for example, on the refueling tanker, etc.) that measure the motion of the rotatable control unit in flight. This information may be used to send commands to an internal motor to decelerate or accelerate the rotation rate of the rotatable control unit, and thus, generate the desired control force to stabilize the drogue refueling apparatus. Also, during flight operations when the rotatable control unit is rotating, electrical energy may be generated by the internal motor. This energy may be stored so that it is available, e.g., for powering the electronics, accelerating the control unit, and holding the rotatable control unit stationary when needed.

And still further, in one or more embodiment, the system may include, or use, sensors (e.g., sensors within the rotatable control units, sensors external from the rotatable control units such as, for example, on the refueling tanker, etc.) that measure the position of the rotatable control unit relative to the tanker aircraft or the receiver aircraft in flight. This information may be used to send commands to the motors to vary the roll angle of each control unit to achieve the net control force vector used to position the drogue relative to the tanker aircraft or the receiver aircraft.

In essence, the exemplary systems and apparatus may be described as providing sufficient control authority and frequency response to position and/or stabilize drogue refueling apparatus in various weather conditions using only one simple actuator (e.g., an internal electric motor) that is contained within the body or housing, including only one external moving part (e.g., the rotatable control unit) to reduce cost, maintenance, and FOD potential, employing control fins that are lightweight and fully supported to be rigid and durable, being self-powered, being a self-contained unit that can be installed in minutes without tools, not requiring modifications to the tanker aircraft or receiver aircraft, and facilitating the aerial refueling of manned and unmanned aircraft.

One exemplary actively stabilized drogue refueling system may use an aerodynamic control unit to reduce the motion of a fuel hose, a refueling coupling and a drogue to significantly increase the success rate, safety, and cost effectiveness of aerial refueling for both manned and unmanned receiver aircraft. The rotatable control unit may be mounted between an aft end of the fuel hose and the refueling coupling.

Further, the exemplary system may include control fins that are fixedly integrated with the control unit. The control fins may be attached, or coupled, to the control unit with different deflection angles so that the fins generate a relatively large control force and an acceptable rolling moment. Further, the control fins may be sized so that the fins can fit into a tanker aircraft without having to deform, fold, deflect, and/or move with respect to the body portion of the control unit or change geometry.

Still further, the magnitude and direction of the effective control force applied to the refueling coupling and drogue may be cyclically controlled by varying the roll rate the of the control unit. An electric motor may be used to vary the roll rate of the control unit. Also, the rolling moment from the integrated control fins may be used to rotate the electric motor to generate energy. The generated energy may be stored locally to run the system electronics and power the motor when being used to accelerate the control unit or hold the control unit stationary. The generated energy may be stored locally in a bank of capacitors. The above summary of the present disclosure is not intended to describe each embodiment or every implementation thereof. Advantages, together with a more complete understanding of the present disclosure, will become apparent and appreciated by referring to the following detailed description and claims taken in conjunction with the accompanying drawings.

The above summary of the present disclosure is not intended to describe each embodiment or every implementation thereof. Advantages, together with a more complete understanding of the present disclosure, will become apparent and appreciated by referring to the following detailed description and claims taken in conjunction with the accompanying drawings.

BRIEF DESCRIPTION OF THE DRAWINGS

FIG. 8 is a block diagram of an exemplary control system for use in controlling movement of any object through a fluid for use within the exemplary apparatus and systems of FIGS. 3-7.

DETAIL DESCRIPTION OF EXEMPLARY EMBODIMENTS

Figure 1:
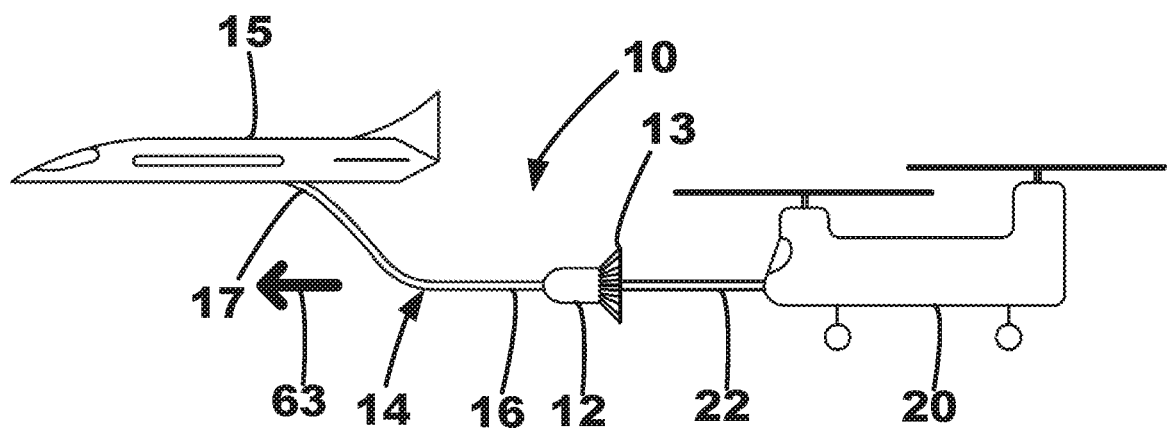
FIG. 1 is a diagrammatic view of a refueling tanker refueling an aircraft using a drogue refueling apparatus.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary systems, apparatus, and methods for use in controlling movement of objects moving through a fluid or fluid medium shall be described with reference to FIGS. 1-8. It will be apparent to one skilled in the art that elements or processes from one embodiment may be used in combination with elements or processes of the other embodiments, and that the possible embodiments of such systems, apparatus, and methods using combinations of features set forth herein is not limited to the specific embodiments shown in the Figures and/or described herein. Further, it will be recognized that the embodiments described herein may include many elements that are not necessarily shown to scale. Still further, it will be recognized that timing of the processes and the size and shape of various elements herein may be modified but still fall within the scope of the present disclosure, although certain timings, one or more shapes and/or sizes, or types of elements, may be advantageous over others.

Figure 2:
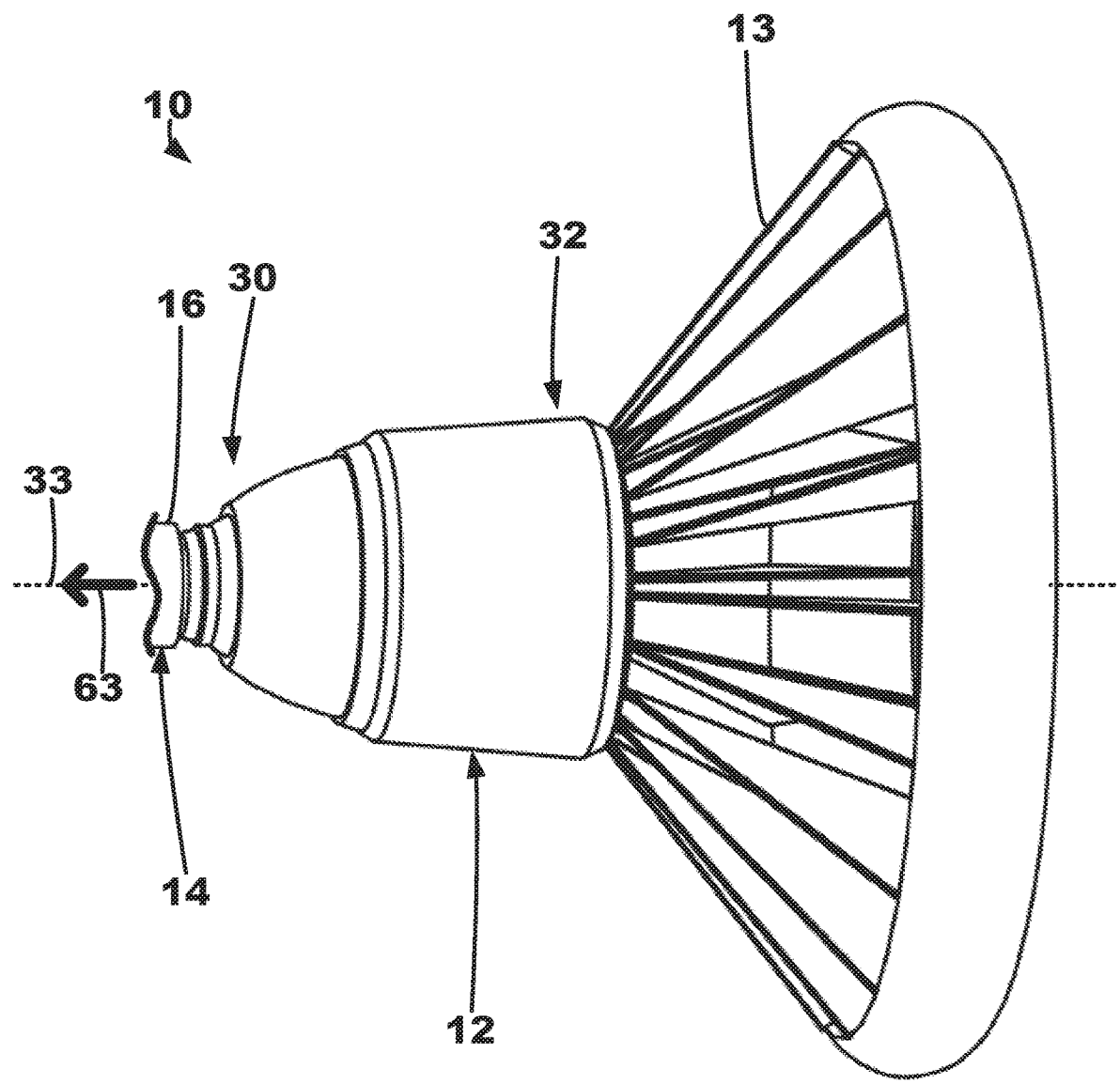
FIG. 2 is side view of an exemplary refueling coupling and a drogue of the drogue refueling apparatus of FIG. 1.

An exemplary refueling coupling 12 and drogue 13 of the drogue refueling apparatus 10 of FIG. 1 is depicted in FIG. 2. The exemplary apparatus, systems, and methods may be described as being capable of retro-fitting the exemplary drogue refueling apparatus 10 to be able to control the movement of the drogue refueling coupling 12 and associated parts or portions. In other words, the exemplary apparatus and systems may be coupled, or attached, to the drogue apparatus 10, e.g., forward of the refueling coupling 12, to provide movement control functionality as described herein. Further, in one or more embodiments, no portions of the drogue refueling apparatus 10 including the refueling coupling 12 may need to be modified or replaced for use with the exemplary systems and apparatus as described herein. The exemplary apparatus, systems, and methods may be further described as a retrofit kit for use with drogue refueling apparatus such that existing users may purchase the retrofit kit to retrofit their drogue refueling apparatus.

Although the exemplary systems, apparatus, and methods are primarily described herein with respect to the drogue refueling apparatus 10, and more specifically, the drogue refueling couplings 12, it is to be understood that the exemplary systems, apparatus, and methods may be used with, or operated in conjunction with, other objects moving through a fluid or fluid medium (such as, e.g., air, water, etc.) For example, the exemplary systems, apparatus and methods may be used with aircraft, spacecraft, water craft, rockets, missiles, projectiles, torpedoes, etc.

The refueling coupling 12 of FIG. 2 may be described as extending from a forward region 30 to an aft region 32 along an axis 33. The forward region 30 may be coupled, or attached, to the aft end portion 16 of the fuel hose 14 (shown in FIG. 1) and the aft region 32 may be coupled, or attached, to the drogue 13. As described herein, the refueling coupling 12 may move through the air while being towed by a tanker aircraft 15 via a fuel hose 14. The refueling coupling 12 may be described as moving along a direction of travel 63 when being towed through the air that may be the same or similar to the axis 33. Various portions of the exemplary systems and apparatus may be described herein with respect to the axis 33 of the refueling coupling 12 and the direction of the travel 63 of the refueling coupling 12. Although the axis 33 of the refueling coupling 12 and the direction of travel 63 of the refueling coupling 12 may not always be the same depending on various factors (such as, e.g., travel speed, wind conditions, etc.), it is to be understood that the axis 33 of the refueling coupling 12 and the direction of the travel 63 may be used relatively interchangeably when, e.g., describing the rotational moments and/or forces applied by the exemplary systems and apparatus to move the refueling coupling 12.

Further, although not described in further detail herein, the refueling coupling 12 may include any apparatus configured to, or operable to, facilitate the functionality of the refueling coupling 12 such as e.g., mating and un-mating with a refueling probe 22 of an aircraft 20, etc. The drogue refueling apparatus 10 including the refueling coupling 12 and the drogue 13 may be described as passive components that are subject to motion induced by atmospheric turbulence, tanker wake, tanker motion, and aircraft receiver forebody effects. The exemplary systems and apparatus may be described as being configured to actively stabilize the drogue refueling apparatus 10 to reduce the induced motion, and to significantly increase the success rate, safety, and cost effectiveness of aerial refueling for both manned and unmanned receiver aircraft. The exemplary systems and apparatus may also be described as being configured to move the drogue refueling apparatus to a desired position relative to the tanker aircraft or the receiver aircraft based on control inputs.

Figure 3:
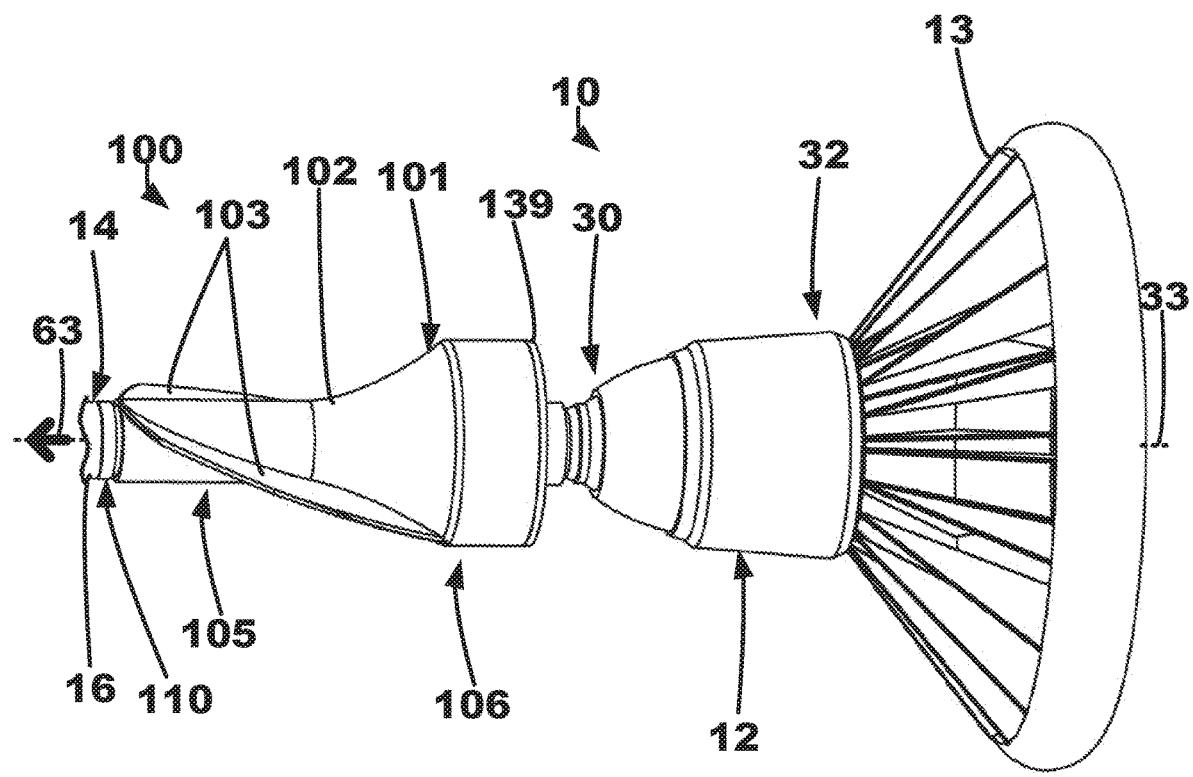
FIG. 3 is the side view of the refueling coupling and a drogue of the drogue refueling apparatus of FIG. 2 and an exemplary system coupled to the drogue refueling apparatus.
Figure 4:
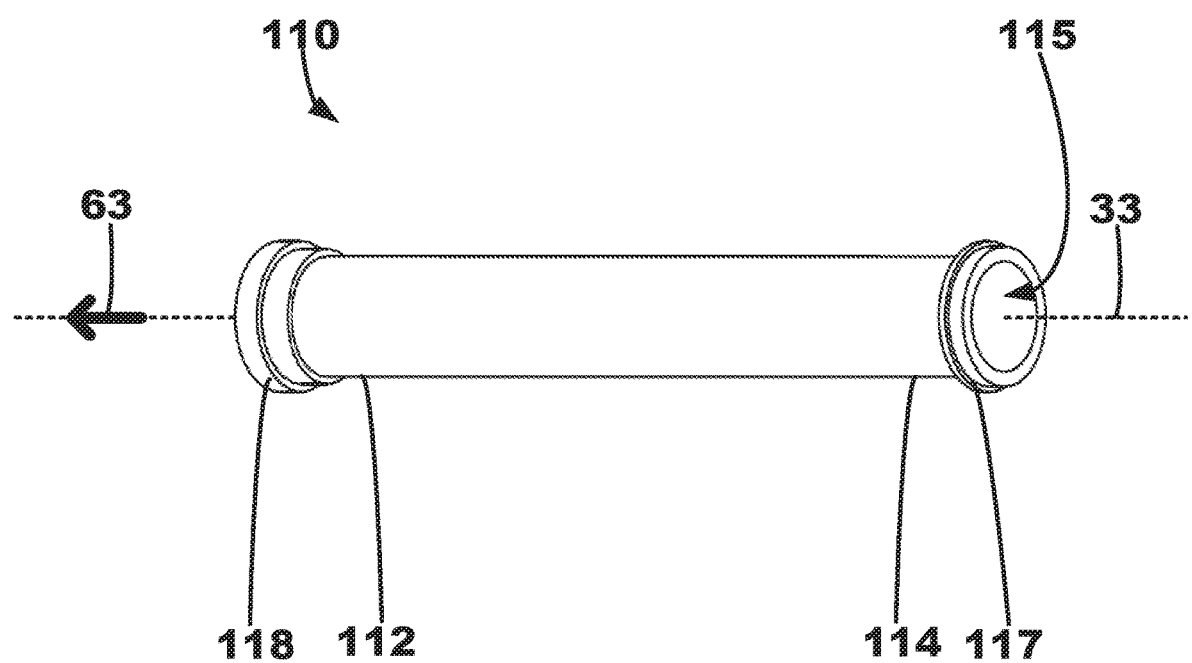
FIG. 4 is a side view of an elongate member of the exemplary system of FIG. 3.

An exemplary system 100 for controlling movement of an object such as the drogue refueling apparatus 10, and more specifically, the refueling coupling 12, of FIGS. 1-2, moving through a fluid is depicted in FIGS. 3-5. The exemplary system 100 includes a single rotatable control unit 101 that is rotatably coupled to the drogue refueling apparatus 10. In other embodiments, more than one rotatable control unit 101 may be utilized.

The rotatable control unit 101 may be configured to rotate about the axis 33 of the refueling coupling 12 in a first or second rotational direction (i.e., clockwise or counterclockwise, respectively) to provide various functionality to the exemplary system 100. For example, the rotatable control unit 101 may be configured to rotate about the axis 33 of the refueling coupling 12 in a first or second rotational direction to assist in moving the drogue refueling apparatus 10 including the refueling coupling 12 in a direction at least partially perpendicular to the axis 33 and/or the direction of travel 63 of the refueling coupling 12. More specifically, the rotatable control unit 101 may be rotated and held in a specific configuration to generate a force vector at least partially perpendicular to the axis 33 or may be slowed about at portion of the rotational cycle about the axis 33 to generate a force vector at least partially perpendicular to the axis 33 as will be described further herein. Further, for example, the rotatable control unit 101 may be configured to rotate about the axis 33 of the refueling coupling 12 in a first or second rotational direction to generate electricity e.g., to be stored in electricity storage units for use by one or more electric motors as further described herein.

To assist in moving the drogue refueling apparatus 10 including the refueling coupling 12 in a direction at least partially perpendicular to the axis 33, the rotatable control unit 101 may include a body portion 102 and one or more fins 103 extending from the body portion 102. The one or more fins 103 may be "fixed" (e.g., fixedly coupled, fixedly extending therefrom, rigid, resilient, etc.) with respect to the body portion 102 such that the fins 103 may not move relative to the body portion 102 as will be described further herein. The body portion 102 may be the portion, or part, of the rotatable control unit 101 that is rotatably coupled to the drogue refueling apparatus 10 and configured to rotate about the axis 33. The body portion 102 may include (e.g., be formed of) one or more materials such as, e.g., aluminum, titanium, steel, carbon fiber, fiberglass, polymer, plastic, rubber, composite, and combinations thereof. Generally, the rotatable control unit 101 may be described as being coupled forward of (e.g., in front of, upstream of) the forward region 30 of the refueling coupling 12 of the drogue refueling apparatus 10. In this way, the refueling coupling 12 may not be modified to be used with the exemplary system 100 described herein.

In other words, the exemplary system 100 may include a rotatable, or rotating, control unit 101 mounted just forward of the refueling coupling 12. The rotatable control unit 101 may be described as incorporating two low-aspect-ratio fins 103 that are integrally molded and/or rigidly attached to a central, axisymmetric body portion 102 (e.g., axisymmetric about the axis 33). Both fins 103 may rigidly extend from the body portion 102 at fixed deflection angles that are in the same direction but are of slightly different magnitude as will be described further herein.

The body portion 102 of the rotatable control unit 101 may be further described as including a fin region 105 and a housing region 106. In view of the direction of travel 63 of the refueling coupling 12, the fin region 105 may be located forward of (e.g., in front of, upstream of, etc.) the housing region 106, and conversely, the housing region 106 may be located aft of (e.g., behind of, downstream of, etc.) the fin region 105. In this embodiment, the one or more fins 103, which will be described further herein, may be coupled to and extend from the body portion 102 within the fin region 105. Further, in at least one embodiment, no fins may be coupled to and extend from the housing region 106 of the body portion 102. The fin region 105 may also be described as defining a taper along a portion of the fin region 105, which expands the diameter of the body portion 102 from a diameter (extending perpendicular to the axis 33) similar to, or slightly larger, than the fuel hose 14 to a diameter similar to the diameter of the refueling coupling 12.

The body portion 102 may be rotatably coupled to the refueling coupling 12 in various ways. In this embodiment, the exemplary system 100 may include an elongate member 110 extending from a forward end region 112 to an aft end region 114. The elongate member 110 may be described as being a relatively-short length of rigid pipe. The forward end region 112 of the elongate member 110 may be coupled, or attached, to the aft end portion 16 of the fueling hose 14, and the aft end region 114 may be coupled, or attached, to the forward region 30 of the refueling coupling 12. The elongate member 110 may define an opening, or passageway, 115 extending from the forward end region 112 to the aft end region 114, which may be configured to transport fuel from the fuel hose 14 through the opening, or passageway, 115 to the refueling coupling 12. In other words, the opening, or passageway, 115 of the elongate member 110 may provide a fluid coupling to each of the fuel hose 14 and the refueling coupling 12 so as to provide fuel flow therethrough. The elongate member 110 may include one or more materials such as, e.g., aluminum, titanium, steel, carbon fiber, fiberglass, polymer, plastic, rubber, composite, and combinations thereof.

The body portion 102 may be rotatably coupled to the elongate member 110 such that, e.g., the body portion 102 may be configured to rotate about the axis 33 while the elongate member 110 remains stationary with respect to the drogue refueling apparatus 10 such as the fuel hose 14, the refueling coupling 12, and the drogue 13. To facilitate such coupling, the system 100 may include a plurality of bearings rotatably coupling the body portion 102 to the elongate member 110. In at least one embodiment, a pair of SILVER THIN JSA030CP0 sealed, radial contact bearings may be used to allow the rotatable control unit 101 to rotate about the elongate member 110. These exemplary bearings may have a 3-inch inside diameter, a 3.5-inch outside diameter, and a 0.25-inch width.

The forward end region 112 may include a fitting 118 and the aft end region 114 may define a lip portion 117 that, e.g., may be configured to restrict the movement of the body portion 102 of the rotatable control unit 101 in either direction along the axis 33. The fitting 118 may be removably coupled to the forward end region 112 such that the fitting 118 may be removed to slide the body portion 102 onto or off of the elongate member 110 and may be re-coupled to the forward end region 112 to secure the body portion 102 onto the elongate member 110 between the fitting 118 and the lip portion 117.

Figure 5A:
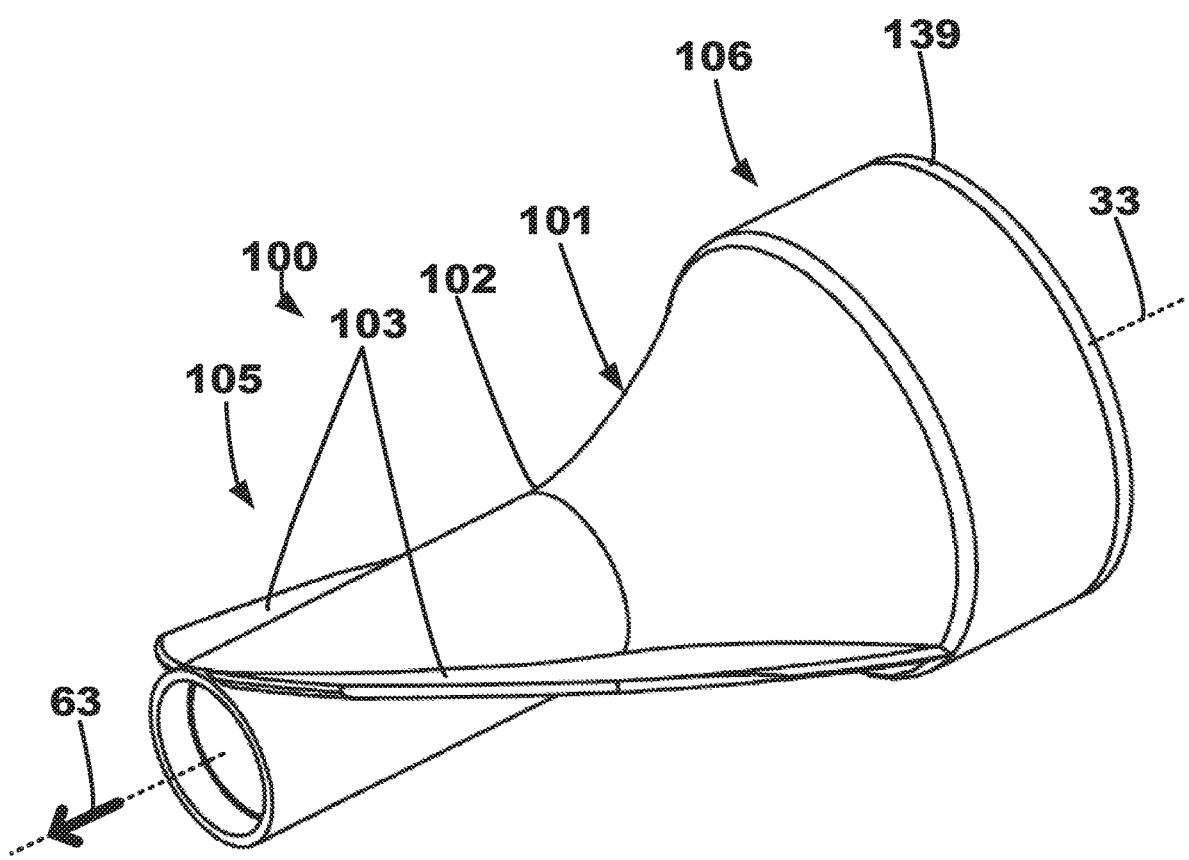
FIG. 5A is a perspective view of a rotatable control unit of the exemplary system of FIG. 3.
Figure 5B:
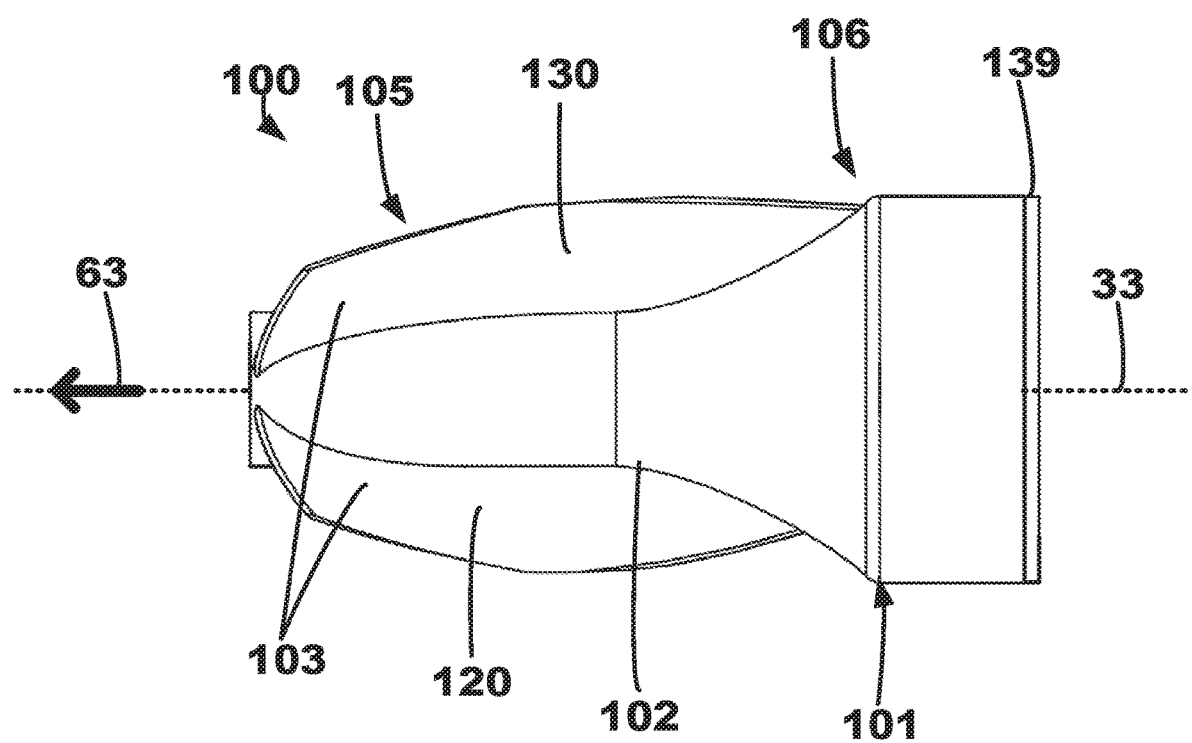
FIG. 5B is a top view of a rotatable control unit of the exemplary system of FIG. 3.
Figure 5C:
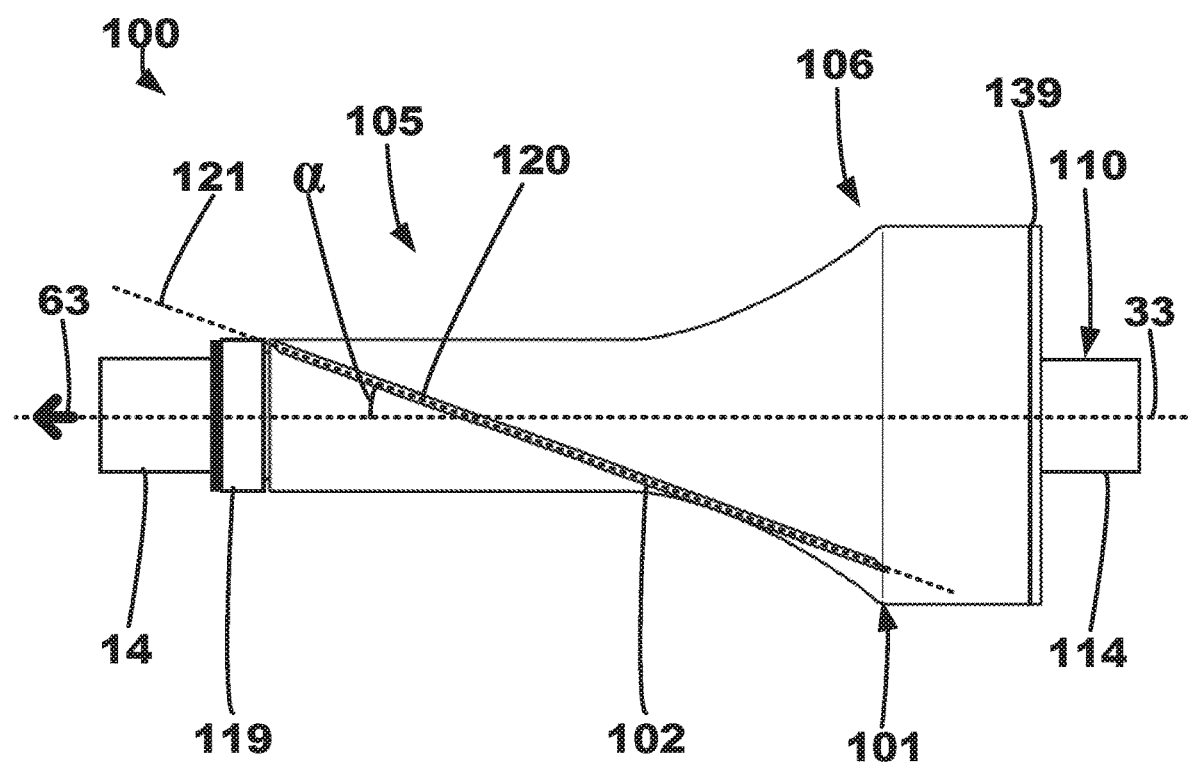
FIG. 5C is a first side view of the exemplary system of FIG. 3.

A clamshell fitting 119 as shown in FIG. 5C may be coupled to one or both of the forward end and aft end regions 112, 114 of the elongate member 110 to be used with the lip portion 117 to, e.g., hold, or restrict movement of the body portion 102 of the rotatable control unit 101 in either direction along the axis 33. Further, one benefit of the bearings described herein may be that the outside diameter of the bearings may be sized such that the bearings allow the forward outer perimeter of the body portion 102 to be equal to the outside diameter of the clamshell fitting 119, which may reduce the chance for damage to the front edge of the rotatable control unit 101 as it is retracted into the tanker aircraft.

In other words, rotatable control unit 101 may rotate on the elongate member, or carrier pipe, 110, which is mounted between the aft end portion 16 of the fueling hose 14 and the forward region 30 of the refueling coupling 12. The rotatable control unit 101 may be secured to the aft end portion 16 of the fuel hose 14 and the forward end region 30 of the refueling coupling 12 using aerial refueling "clamshell" fittings 119. To facilitate maintenance, a fitting 118 may be threaded onto the forward, or upstream, end region 112 of the elongate member 110. To perform maintenance, the fitting 118 may be removed, a backing plate 139 may be unscrewed from the housing region 106 of the body portion 102, and the rotatable control unit 101 may be slid off the elongate member 110. This may allow for rapid replacement of the rotatable control unit 101 and may provide easy access to the internal components.

Figure 6:
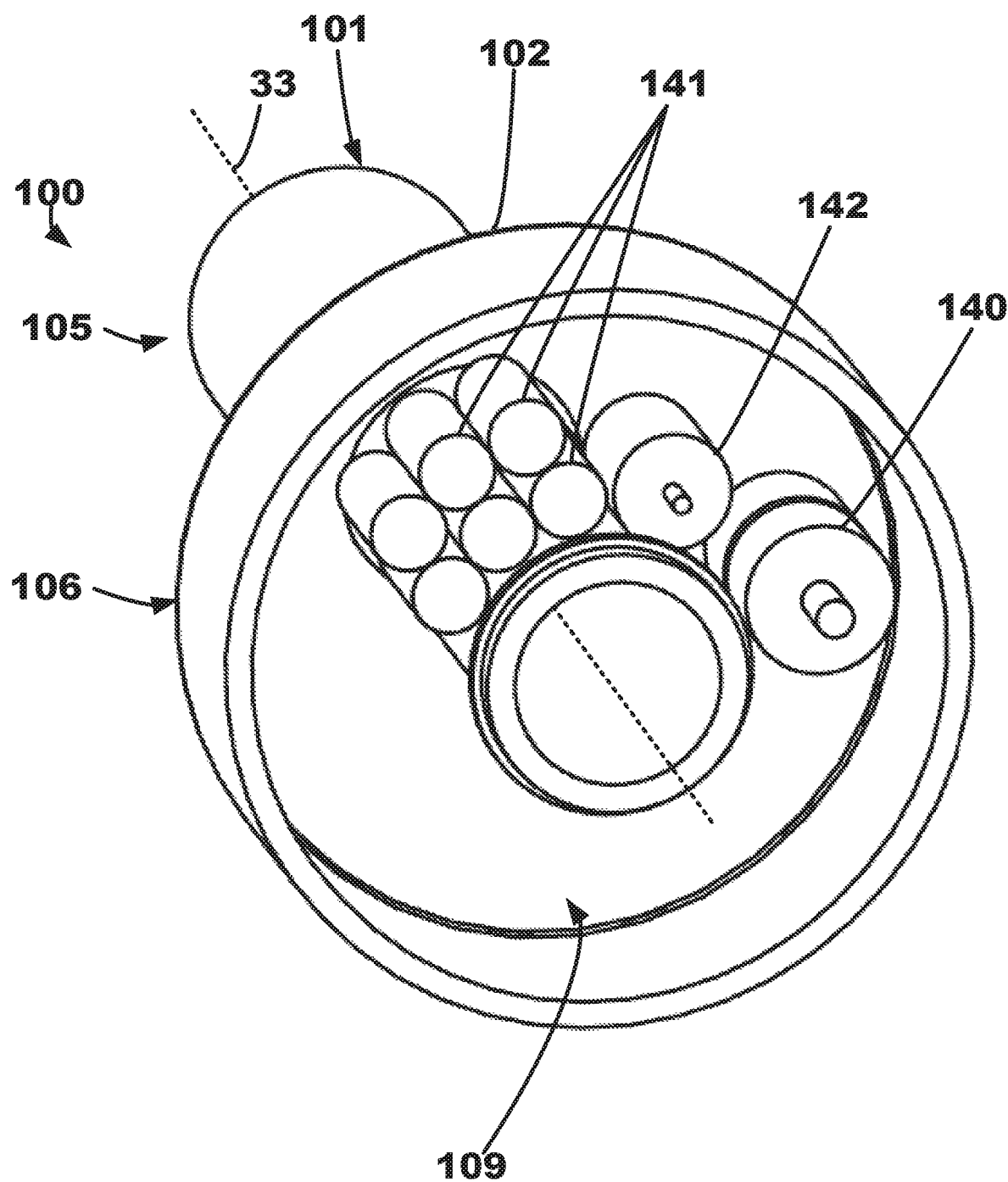
FIG. 6 is a rear perspective view of a rotatable control unit of the exemplary system of FIG. 3.
Figure 7:
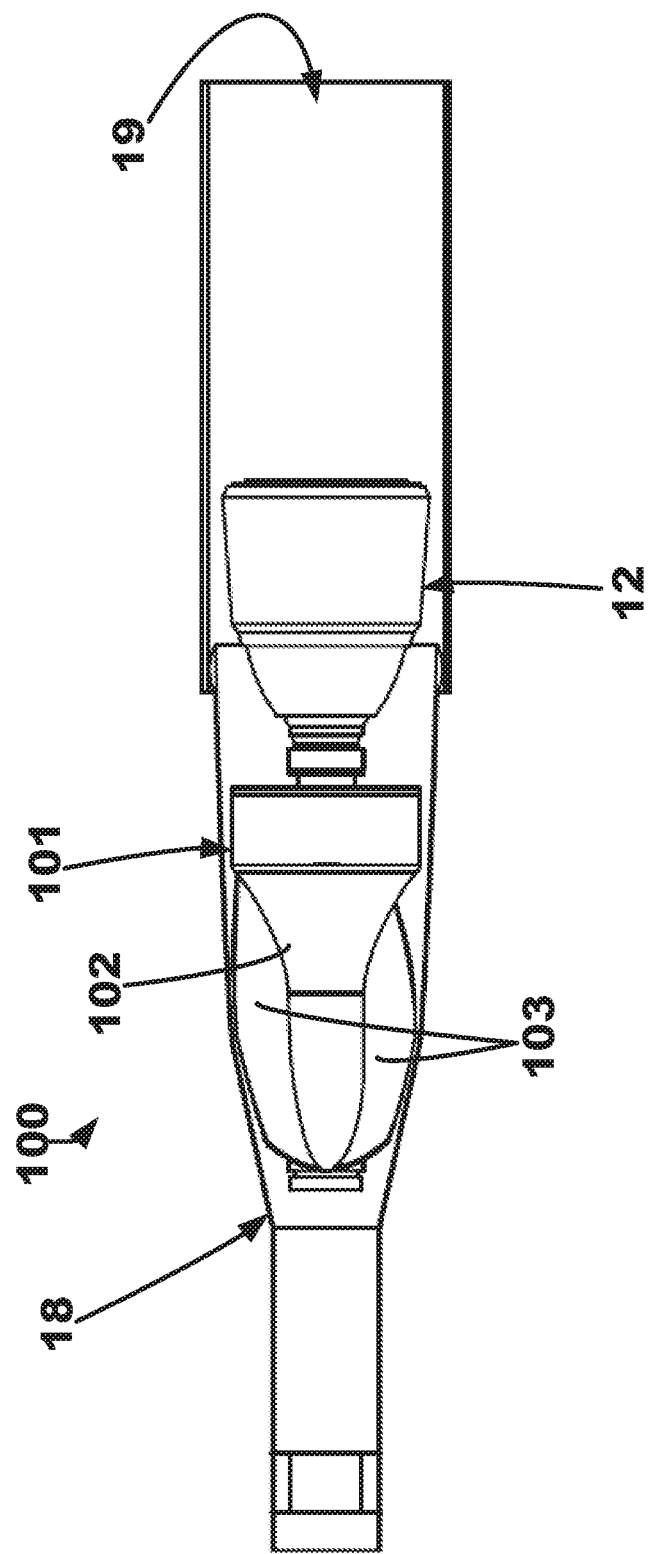
FIG. 7 is a side view of the exemplary system of FIG. 3 within a cross-section of a storage tube of a refueling tanker.

Further, the rotatable control unit 101, and more specifically, the body portion 102 thereof, may be configured to be used with one or more electric motors 140 as shown in FIG. 6 to, e.g., generate electricity when the rotatable unit 101 rotates, selectively control the rate of rotation of the rotatable control unit 101 to selectively move the drogue refueling apparatus 10 in a direction at least partially perpendicular to the axis 33, etc. In one or more embodiments, the motors 140 are a DC brushless motors, which may be beneficial because, e.g., there are no brushes to wear out, the motors may not generate sparks, the motors may be described as being "wash-down" safe, and the only moving parts in the motors may be the main rotor and the two bearings. In at least one embodiment, the system 100 may include a single motor 140.

The rotatable control unit 101, the elongate member 110, and the one or more electric motors 140 may be operably coupled in various ways. For example the electrical motors 140 may be fixedly coupled to one of the rotatable control unit 101 or the elongate member 110. In the embodiment depicted herein, one electric motor 140 is fixedly coupled to the elongate member 110. More specifically, the motor 140 may be described as being rigidly mounted to the elongate member 110 and the motor's shaft may be operably attached to the body portion 102 of the rotatable control unit 101 through a 7:1 gearing system.

In this embodiment, the body portion 102, and more specifically, the housing region 106 of the body portion 102, may define an interior space, or cavity, 109 within which the electric motor 140 is fixedly coupled to the elongate member 110. The interior space 109 may be enclosed by the circular backing plate 139 as described herein with respect to FIG. 5C, which may be removable to provide access to the internal components such as the electric motor 140. The electric motor 140 may be then operably coupled to the body portion 102, and more specifically, the housing region 106 of the body portion 102, such that, e.g., the electric motor 140 may generate electricity when the body portion 102 rotates about the axis 33 and the elongate member 110, the electric motor 140 may slow or stop the rotation of the body portion 102 about the elongate member 110 to provide movement control of the drogue refueling apparatus 10, etc. Although not shown herein, it is to be understood that one or more mechanical gears or other apparatus may be used to operatively couple the electric motor 140, the body portion 102, and the elongate member 110 so as to provide the functionality described herein.

The exemplary system 100 may further include one or more or a plurality of electricity storage units 141 as shown in FIG. 6. Electricity storage units 141 may be operatively coupled to the electric motor 140 so as, e.g., to provide the electric motor 140 with power, to receive power from the electric motor 140 when the electric motors 140 are configured in an electrical power generation mode, etc. The exemplary system 100 may further include a positional encoder, or sensor, 142 that may be configured to determine the rotational position of the body portion 102 with respect to the elongate member 110, or vice versa, which may be used in the exemplary systems and methods for control feedback. The positional, or rotational, encoder 142 may be described as providing data on the roll angle of the rotatable control unit 101 with respect to the elongate member 110, which may be used for operating the motor 140 and determining the relative angle of the control force vector.

As described herein, the rotatable control unit 101 may include one or more or a plurality of fins 103 to assist in moving the drogue refueling apparatus 10 in a direction at least partially perpendicular to the axis 33 and/or direction of travel 63. The fins 103 may be coupled to and extend from the body portion 102. The fins 103 may be described as being fixedly coupled to the body portion 102 such that, e.g., the fins 103 do not move with respect the body portion 102. Further, the fins 103 may be described as being resilient or resistant to deflection as the refueling coupling 12 moves along the direction of travel 63. In other words, the fluid through which the refueling coupling 12 and the system 100 are traveling such as, e.g., air, may act on, or apply a force to, the fins 103, which in turn, may apply a force or moment to the body portion 102, as will be described further herein.

Additionally, in one or more embodiments, the fins 103 may be impact-resistant and/or shatter-resistant. The fins 103 may include one or more materials such as, e.g., aluminum, titanium, steel, carbon fiber, fiberglass, polymer, plastic, rubber, composite, and combinations thereof. In one or more embodiments, the fins 103 may be integral, or formed with, the body portion 102 such that, e.g., the fins 103 and the body portion 102 may be described as "one-piece." In at least one embodiment, the body portion 102 and the fins 103 may be integrally molded to form, or define, the rotatable control unit 101. In one or more embodiments, the rotatable control unit 101 including the body portion 102 (which may be described as being axisymmetric about the axis 33) and integral control fins 103 are made from high-impact polymer using a fused-deposition modeling additive manufacturing process.

The fins 103 may be designed (e.g., sized, positioned, angled, etc.) so as to be able to be used to generate forces to move the refueling coupling 12 in the direction of those forces by selectively rotating the rotatable control unit 101 with respect to the elongate member 110 and/or the drogue refueling apparatus 10. Although it is to be understood that the exemplary system 100 may include a single fin 103 or more than two fins 103, the system 100 shown in FIGS. 3-5 includes a first fin 120 and a second fin 130.

Figure 5D:
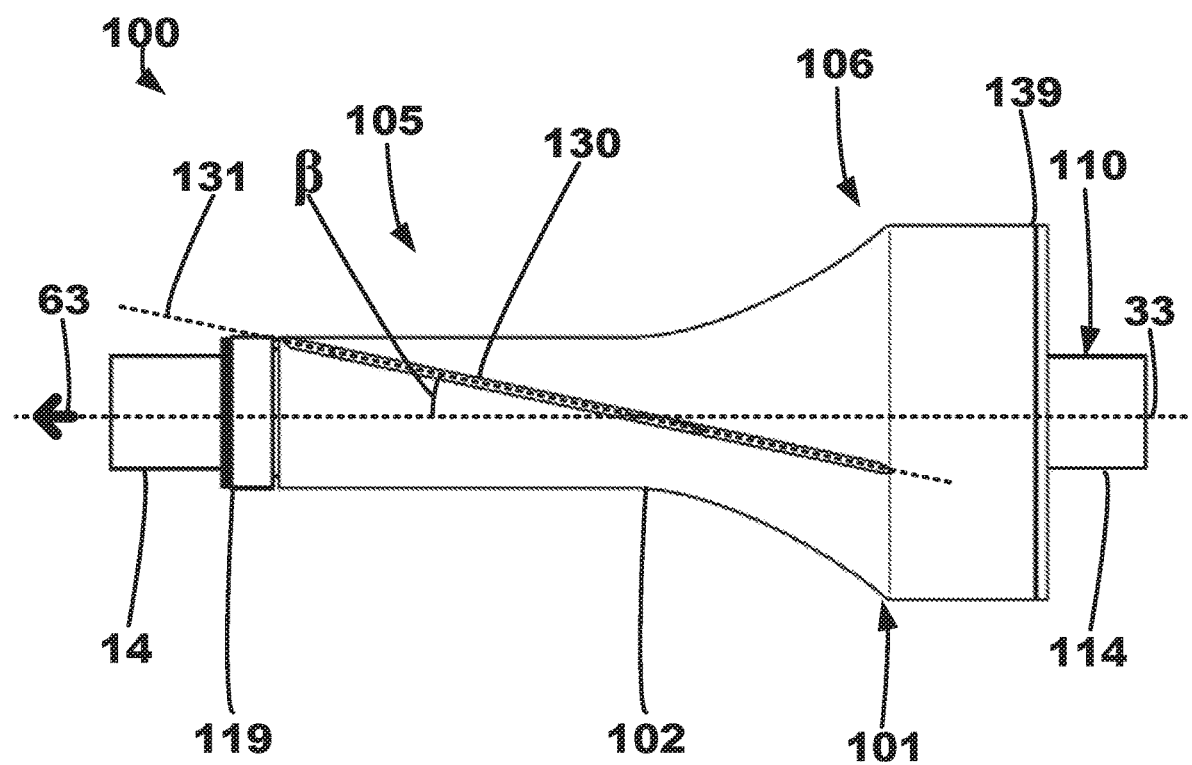
FIG. 5D is a second side view of the exemplary system of FIG. 3 opposite the view shown in FIG. 5C.

The first fin 120 and the second fin 130 may be different one another to, e.g., provide functionality described herein. For example, each of the fins 103 may be described as extending from the body portion 102 along a fin plane, and a deflection angle may be defined between the fin plane and the axis 33. As shown in FIG. 5C, a first deflection angle ALPHA may be defined between a first fin plane 121 of a first fin 120 and the axis 33. As shown in FIG. 5D, a second deflection angle BETA may be defined between a second fin plane 131 of the second fin 130 and the axis 33. The first deflection angle ALPHA may be different than the second deflection angle BETA. For instance, as shown, the first angle ALPHA is greater than the second deflection angle BETA. In other embodiments, the second angle BETA may be greater than the first deflection angle ALPHA.

In at least one embodiment, the first deflection angle Alpha is about 20 degrees, and the second deflection angle Beta is about 12 degrees. The deflection angles may be between about 5 degrees and about 45 degrees. For example, the deflection angles may be greater than or equal to about 5 degrees, greater than or equal to about 15 degrees, greater than or equal to about 20 degrees, greater than or equal to about 30 degrees, greater than or equal to about 40 degrees, etc. Further, for example, the deflection angles may be less than or equal to about 45 degrees, less than or equal to about 35 degrees, less than or equal to about 25 degrees, less than or equal to about 17 degrees, less than or equal to about 12 degrees, etc.

The first and second fins 120, 130 may also be different from one another in other ways other than deflection angle. For example, the first and second fins 120, 130 may also define different sizes (e.g., surface area, width, etc.) and/or different shapes with, e.g., curvatures, so as to provide the functionality described herein. In one or more embodiments, the first fin 120 may be larger than the second fin 130.

Figure 5E:
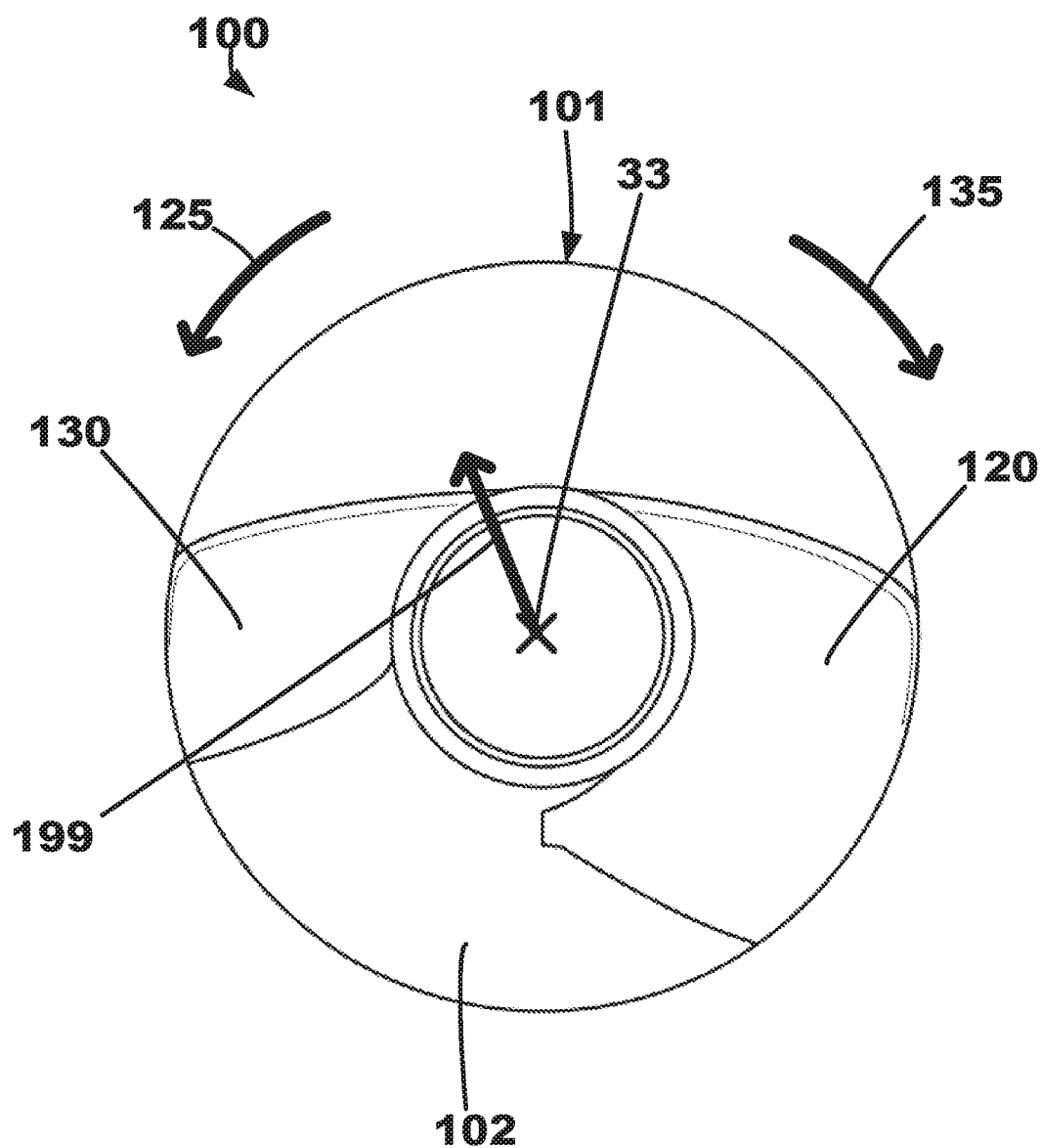
FIG. 5E is a forward side view of the exemplary system of FIG. 3.

Additionally, although each of the first deflection angle alpha and the second deflection angle beta are described in terms of the angles labeled in each of FIGS. 5C and 5D, it is to be understood that the angles generate opposing rotational moments, or forces, about the axis 33 when the rotatable control unit 101 moves through a fluid medium. More specifically, as shown in FIG. 5E, the first fin 120 may be configured to generate a rotational force about the axis 33 in a first rotational direction 125 as the rotatable control unit 101 moves along the direction of travel 63, and the second fin 130 may be configured to generate a rotational force about the axis 33 in a second rotational direction 135 as the rotatable control unit 101 moves along the direction of travel 63. In other words, the first and second fins 120, 130 may be configured to spin, or rotate, the rotatable control unit 101 in the opposite, or opposing, rotational direction about the axis 33.

Regardless of the deflection angle, the size, and the shape of the first fin 120 and the second and 130, one of the first fin and the second fin 120, 130 may be configured such that it generates a larger control force, or moment about the axis 33, then the other fin so as to, e.g., provide the control functionality described herein. In other words, one of the first fin 120 in the second fin 130 may be sized, shaped, and/or angled to provide, or generate, a larger control force than the other fin.

The fins 103 (e.g., first fin 120, second fin 130) may be used by the system 100 to generate various forces 199 at least partially perpendicular to the axis 33 and/or the direction of travel 63 such that, e.g., the system 100 may move the refueling coupling 12 for stabilization, etc. For example, the rotatable control unit 101 may be held stationary, may be slowed, or decelerated, during points or arcs of a rotation while rotating, etc. to generate various forces 199 at least partially perpendicular to the axis 33 and/or the direction of travel 63. In other words, a force vector 199 at least partially (e.g., predominately) perpendicular to the axis 33 and/or the direction of travel 63 may be modified by selectively adjusting the roll rate of the control unit 101 about the axis 33. The roll rate may be selectively adjusted from zero, or being stationary, to be completely unrestricted to so as to spin, or rotate, freely. Additionally, instead of simply slowing the roll rate from spinning freely, the exemplary system 100 may only slow one or more arcs of the rotation about the axis 33 to generate the desired force vector 199.

More specifically, during flight operations, when no control force is desired to stabilize the drogue refueling apparatus 10, the rotatable control unit 101 may be allowed to rotate at a relatively-high roll rate under the influence of the net rolling moment from the two fins 120, 130. This roll rate may be limited and controlled by the electric motors 140. Because this rotation rate may be sufficiently faster than the natural frequency of the system 100 in combination with the drogue refueling apparatus 10, the control force (which may always be present due to the fixed deflection of the fins 120, 130) may impart no significant motion to the refueling coupling 12 and drogue 13.

When a net control force is desired to stabilize the drogue, the electric motor 140 may slow the rotation rate of the rotatable control unit 101 over a portion of the cycle when the control force vector is pointing in the desired direction. If a small force is desired, the rotation rate may be decreased a relatively small amount over a portion of the complete cycle, and if a larger control force is desired, the rotation rate over the desired arc section may be decreased further. The maximum available control force may be achieved by completely stopping the rotatable control unit 101 when the force vector is pointing in the desired direction.

In addition to decelerating the rotatable control unit 101 and holding the rotatable control unit 101 stationary when desired, the electric motor 140 may provide an assistive torque to augment the aerodynamic rolling moment in accelerating the rotatable control unit 101 back up to speed after being slowed, and also may generate electrical energy whenever it applies a resistive torque to the rotatable control unit 101.

The exemplary system 100 may be configured so as to fit, or be received, by a storage tube or another receiving portion of a refueling tanker when the drogue refueling apparatus 10 is retrieved, or reeled-back-in, from the being towed behind the refueling tanker. For example, a side view of the exemplary system 100 within a cross-section of a storage tube 18 of a refueling tanker 15. The storage tube 18 may be attached, or coupled, to the refueling tanker 15 and may define a cavity 19 for receiving and containing one or more portions of the drogue refueling apparatus 10. The exemplary system 100, and more particularly, the rotatable control unit 101 including the body portion 102 and fins 103, may be configured (e.g., sized, shaped, etc.) so as to not interfere with the reception of the drogue refueling apparatus 10 within the cavity 19 of the storage tube 18. Thus, the system 100 and the refueling tanker 15 including the storage tube 18 may not need to be modified when the drogue refueling apparatus 10 is retrofitted with the system such that the drogue refueling apparatus 10 and the system 100 are stowed within the storage tube 18.

Additionally, the fins 103 may be configured to rotate, or spin, the rotatable control unit 101 to generate electricity using the one or more electric motors, or electrical generators, 140. The exemplary system 100 may include one or more electricity storage units 141 (e.g., capacitors) that are operably coupled to the one or more electric motors 140 such that the electricity generated by the one or more electric motors 140 may be stored in the one or more electricity storage units 141. Additionally, the one or more electricity storage units 141 may be used to power, or provide electricity, to run the one or more electric motors 140 as well as any other electrically-driven apparatus of the exemplary system 100 (such as, e.g., controllers, input apparatus, any other electro-mechanical apparatus as described herein with reference to FIG. 8). In other words, the energy stored in a bank of electricity storage units 141 may be subsequently used to run the electronics and accelerate or hold the rotatable control unit 101 stationary using the motor 140.

The system 100 may further include controller 412 as described herein with reference to FIG. 8 to selectively control the rate of rotation of the rotatable control unit 101 to selectively move the refueling coupling 12 in a direction at least partially perpendicular to the axis 33. The computing apparatus 412 may include one or more processors and may be configured to receive input from input apparatus 420 and transmit output to electro-mechanical apparatus 422. Further, the computing apparatus 412 may include data storage 414. Data storage 414 may allow for access to processing programs or routines 416 and one or more other types of data 418 (e.g., sensor data, position data, rotational positional encoding data, global positioning system (GPS) data, image data, inertial measurement unit (IMU) data, etc.) that may be employed to perform, or carry out, exemplary methods and/or processes (e.g., generate predicted movements of the refueling coupling, determine the forces needs for stabilization and/or movement of the refueling coupling, determine the rotational rate of the rotatable control unit for use in stabilization and/or movement, etc.) for use in controlling movement of the refueling coupling. The computing apparatus 412 may be operatively coupled to the input apparatus 420 and the electro-mechanical apparatus 422 to, e.g., transmit data to and from each of the input apparatus 420 and the electro-mechanical apparatus 422. For example, the computing apparatus 412 may be operatively coupled to each of the input apparatus 420 and the electro-mechanical apparatus 422 using, e.g., analog electrical connections, digital electrical connections, wireless connections, bus-based connections, etc.

Further, various devices and apparatus may be operatively coupled to the computing apparatus 412 to be used with the computing apparatus 412 to perform the functionality, methods, and/or logic described herein. As shown, the system 100 may include input apparatus 420 and electro-mechanical apparatus 422 operatively coupled to the computing apparatus 412 (e.g., such that the computing apparatus 412 may be configured to use information, or data, from the apparatus 420, 422 and provide information, or data, to the apparatus 420, 422). The input apparatus 420 may include any apparatus capable of providing input to the computing apparatus 412 to perform the functionality, methods, and/or logic described herein. For example, the input apparatus 420 may include any apparatus configured to assist in controlling the movement of the refueling coupling 12 such as the positional encoder 142. For example, accelerometers, position sensors, image sensors, global positioning system (GPS) sensors, inertial measurement units (IMU), etc. may also be used to provide input to the computing apparatus 412 regarding the position and/or movement of the refueling coupling 12.

In one or more embodiments, the computing apparatus 412 and the input apparatus 420 may be located within the refueling coupling 12 as part of the system 100. Further, in one or more embodiments, the computing apparatus 412 and the input apparatus 420 may be may be located elsewhere such as the tanker aircraft 15 and operatively coupled to the remainder of the system 100 (e.g., wireless, wired along the refueling hose, etc.).

The electro-mechanical apparatus 422 may include any apparatus capable of controlling the movement of the refueling coupling 12 such as the rotatable control unit 101. More specifically, the electro-mechanical apparatus 422 may include the one or more electric motors 140 configured to rotate, or control the rotation, of the rotatable control unit 101 and the one or more electricity storage units 141.

The processing programs or routines 416 may include programs or routines for data recording, computational mathematics, matrix mathematics, standardization algorithms, comparison algorithms, or any other processing required to implement one or more exemplary methods and/or processes described herein. Data 418 may include, for example, variables, results from one or more processing programs or routines employed according to the disclosure herein, or any other data that may be necessary for carrying out the one and/or more processes or methods described herein.

In one or more embodiments, the system 100 may be implemented using one or more computer programs executed on programmable computers, such as computers that include, for example, processing capabilities, data storage (e.g., volatile or non-volatile memory and/or storage elements), input devices, and output devices. Program code and/or logic described herein may be applied to input data to perform functionality described herein and generate desired output information. The output information may be applied as input to one or more other devices and/or methods as described herein or as would be applied in a known fashion.

The program used to implement the methods and/or processes described herein may be provided using any programmable language, or code, e.g., a high level procedural and/or object orientated programming language or code that is suitable for communicating with a computer system. Any such programs may, for example, be stored on any suitable device, e.g., a storage media, that is readable by a general or special purpose program running on a computer system (e.g., including processing apparatus) for configuring and operating the computer system when the suitable device is read for performing the procedures described herein. In other words, at least in one embodiment, the system 100 may be implemented using a computer readable storage medium, configured with a computer program, where the storage medium so configured causes the computer to operate in a specific and predefined manner to perform functions described herein. Further, in at least one embodiment, the system 100 may be described as being implemented by logic (e.g., object code) encoded in one or more non-transitory media that includes code for execution and, when executed by one or more processors, is operable to perform operations such as the methods, processes, and/or functionality described herein.

The computing apparatus 412 may be, for example, any fixed or mobile computer system (e.g., a controller, a microcontroller, a personal computer, mini computer, etc.). The exact configuration of the computing apparatus 412 is not limiting, and essentially any device capable of providing suitable computing capabilities and control capabilities may be used. As described herein, a digital file may be any medium (e.g., volatile or non-volatile memory, a CD-ROM, a punch card, magnetic recordable tape, etc.) containing digital bits (e.g., encoded in binary, trinary, etc.) that may be readable and/or writeable by computing apparatus 412 described herein. Also, as described herein, a file in user-readable format may be any representation of data (e.g., ASCII text, binary numbers, hexadecimal numbers, decimal numbers, graphically, etc.) presentable on any medium (e.g., paper, a display, etc.) readable and/or understandable by a user.

In view of the above, it will be readily apparent that the functionality as described in one or more embodiments according to the present disclosure may be implemented in any manner as would be known to one skilled in the art. As such, the computer language, the computer system, or any other software/hardware which is to be used to implement the processes described herein shall not be limiting on the scope of the systems, processes or programs (e.g., the functionality provided by such systems, processes or programs) described herein.

The methods and/or logic described in this disclosure, including those attributed to the systems, or various constituent components, may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, or other devices. The term "processor" or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems, devices and methods described in this disclosure may be embodied as instructions and/or logic on a computer-readable medium such as RAM, ROM, NVRAM, EEPROM, FLASH memory, magnetic data storage media, optical data storage media, or the like. The instructions and/or logic may be executed by one or more processors to support one or more aspects of the functionality described in this disclosure.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the systems, apparatus, and methods described herein. Various modifications of the illustrative embodiments, as well as additional embodiments of the disclosure, will be apparent upon reference to this description.

What is claimed is:

1. A system for controlling movement of a drogue refueling apparatus comprising:
a rotatable control unit to controllably rotate about an axis to move the drogue refueling apparatus in a direction at least partially perpendicular to the axis, wherein the rotatable control unit comprises:
a body portion rotatably couplable to the drogue refueling apparatus; and
one or more resilient fins fixedly coupled to and extending from the body portion along one or more fin planes, wherein the one or more resilient fins are resilient to deflection to generate at least a rotational force about the axis in response to fluid flow as the drogue refueling apparatus moves along a direction of travel, wherein at least one resilient fin extends from the body such that the fin plane of the at least one resilient fin is non-coplanar with the axis.

2. The system of claim 1, wherein the one or more fins comprises a first fin and a second fin, wherein a first deflection angle is defined between the fin plane of the first fin and the axis and a second deflection angle is defined between the fin plane of the second fin and the axis, wherein the first deflection angle is greater than the second deflection angle.

3. The system of claim 1, wherein the one or more fins comprises a first fin and a second fin, wherein the first and second fins are positioned about the body portion to produce opposing rotational moments about the axis in response to fluid flow as the drogue refueling apparatus moves along a direction of travel.

4. The system of claim 1, wherein the body portion is couplable to the drogue refueling apparatus forward of a refueling coupling of the drogue refueling apparatus in the direction of travel of the drogue refueling apparatus.

5. The system of claim 1, wherein the system further comprises an elongate member extending from a forward end region couplable to a hose to a rearward end region couplable to a refueling coupling of the drogue refueling apparatus, wherein the rotatable control unit is rotatably coupled to the elongate member between the forward end region and the rearward end region.

6. The system of claim 1, wherein the body portion and the one or more resilient fins are integrally molded to define the rotatable control unit.

7. The system of claim 1, wherein the system further comprises:
   one or more electric motors operably coupled to the rotatable control unit to rotate the rotatable control unit about the axis; and
   a controller comprising one or more processors and operably coupled to the one or more motors, wherein the controller is configured to selectively control the rate of rotation of the rotatable control unit to move the drogue refueling apparatus in a direction at least partially perpendicular to the axis.

8. The system of claim 7, wherein the system further comprises one or more electricity storage units, wherein the one or more electric motors are operably coupled to the one or more electricity storage units and to the rotatable control unit to generate electricity to be stored in the electricity storage units when the rotatable control unit rotates about the axis.

9. A kit for retrofitting a drogue refueling apparatus comprising:
   an elongate member extending from a forward end region couplable to a fuel hose of a drogue refueling apparatus to a rearward end region couplable to a refueling coupling of the drogue refueling apparatus; and
   a rotatable control unit to controllably rotate about an axis to move the drogue refueling apparatus in a direction at least partially perpendicular to the axis, wherein the rotatable control unit comprises:
      a body portion rotatably couplable to the elongate member to controllably rotate about an axis to move the drogue refueling apparatus in a direction at least partially perpendicular to the axis; and
      one or more resilient fins fixedly coupled to and extending from the body portion, wherein the one or more resilient fins are resilient to deflection to generate rotational force about the axis in response to fluid flow as the drogue refueling apparatus moves along a direction of travel.

10. The kit of claim 9, wherein the one or more resilient fins comprises a first fin and a second fin, wherein a first deflection angle is defined between the fin plane of the first fin and the axis and a second deflection angle is defined between the fin plane of the second fin and the axis, wherein the first deflection angle is greater than the second deflection angle.

11. The kit of claim 9, wherein the one or more resilient fins comprises a first fin and a second fin, wherein the first and second fins are positioned about the body portion to produce opposing rotational moments about the axis in response to fluid flow as the drogue refueling apparatus moves along a direction of travel.

12. The kit of claim 9, wherein the body portion is couplable to the drogue refueling apparatus forward of the refueling coupling of the drogue refueling apparatus in the direction of travel of the drogue refueling apparatus.

13. The kit of claim 9, wherein the kit further comprises:
   one or more electric motors operably coupled to the rotatable control unit to rotate the rotatable control unit about the axis; and
   a controller comprising one or more processors and operably coupled to the one or more motors, wherein the controller is configured to selectively control the rate of rotation of the rotatable control unit to move the drogue refueling apparatus in a direction at least partially perpendicular to the axis.

14. The kit of claim 9, wherein the body portion and the one or more resilient fins are integrally molded to define the rotatable control unit.

* * * * *